US011463323B2

(12) United States Patent
Tal et al.

(10) Patent No.: US 11,463,323 B2
(45) Date of Patent: Oct. 4, 2022

(54) DISCOVERY PROCESS IDENTIFICATION AND CLASSIFICATION

(71) Applicant: SERVICENOW, INC, Santa Clara, CA (US)

(72) Inventors: Hail Tal, Kohav Yair (IL); Yuval Rimar, Petah Tikva (IL); Qingbin Li, Kirkland, WA (US); Leonid Suslov, Tel Aviv (IL); Robert Bitterfeld, Petah Tikva (IL); Asaf Garty, Petach-Tikva (IL); Sreenevas Subramaniam, Dublin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 168 days.

(21) Appl. No.: 16/928,802

(22) Filed: Jul. 14, 2020

(65) Prior Publication Data

US 2022/0021588 A1 Jan. 20, 2022

(51) Int. Cl.
*H04L 41/16* (2022.01)
*H04L 41/12* (2022.01)
*G06K 9/62* (2022.01)
*H04L 41/0816* (2022.01)
*G06N 20/00* (2019.01)

(52) U.S. Cl.
CPC ............ *H04L 41/16* (2013.01); *G06K 9/6215* (2013.01); *G06K 9/6256* (2013.01); *G06N 20/00* (2019.01); *H04L 41/0816* (2013.01); *H04L 41/12* (2013.01)

(58) Field of Classification Search
CPC ..... H04L 41/16; H04L 41/0816; H04L 41/12; G06K 9/6215; G06K 9/6256; G06N 20/00
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,877,783 B1 | 1/2011 | Cline |
| 7,925,981 B2 | 4/2011 | Pourheidari |

(Continued)

*Primary Examiner* — Tonia L Dollinger
*Assistant Examiner* — Joseph M Cousins
(74) *Attorney, Agent, or Firm* — Fletcher Yoder PC

(57) ABSTRACT

Embodiments presented herein provide apparatus and techniques for identifying and classifying processes and associated applications executing in a network. All processes executing in a network may be identified using a discovery process. The processes may be clustered based on associations between the processes. Suggested application entries may then be generated based at least in part on the clusters of processes. A configuration item type and a discovery pattern may be generated for each suggested application entry. A subsequent discovery process may use the configuration item type and discovery patterns to identify associated configuration items in the network.

20 Claims, 5 Drawing Sheets

(56) References Cited

U.S. PATENT DOCUMENTS

| | | |
|---|---|---|
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 2011/0106772 A1* | 5/2011 | Kawamura ......... G06K 9/6254 707/E17.046 |
| 2013/0290238 A1* | 10/2013 | Griffith ................. G06N 5/025 706/47 |
| 2014/0195504 A1* | 7/2014 | Morozov ......... G06F 16/90324 707/694 |
| 2017/0195178 A1* | 7/2017 | Kaluza ................ H04L 41/0816 |
| 2019/0303485 A1* | 10/2019 | Teruya .................. G06F 16/248 |
| 2020/0257585 A1* | 8/2020 | Balasubramanian ........................ G06F 11/0709 |
| 2020/0320430 A1* | 10/2020 | Kunnumma ........... G06N 20/00 |
| 2021/0176191 A1* | 6/2021 | Pargaonkar ......... H04L 61/3015 |

\* cited by examiner

| ≡ SUGGESTED NAME ⌐302 | ≡ MAIN PROCESS ⌐304 | ≡ PROCESS COUNT ⌐306 | ≡ VIEW PROCESSES ⌐308 | ≡ SUGGESTED CMDB CLASS ⌐310 | ≡ SUGGESTED RULE ⌐312 |
|---|---|---|---|---|---|
| FLEXSVR | "flexsvr.exe" | | VIEW PROCESSES | cmdb_ci_flexsvr | [\W+]*C[\W+]*Program[\W_]*Files[\W+]*[... |
| EMBRAVACONNECTSKYPEADDIN | "EmbravaConnectSkypeAddin.exe" | | VIEW PROCESSES | cmdb_ci_embravaconnectskypeaddin | [\W+]*C[\W+]*Program[\W_]*Files[\W+]*[x... |
| AESMSERVICE | "aesm_service.exe" | | VIEW PROCESSES | cmdb_ci_aesmservice | [\W+]*C[\W+]*Program[\W_]*Files[\W+]*[In... |
| DSACCESSSERVICE | "DsAccessService.exe" | | VIEW PROCESSES | cmdb_ci_dsaccessservice | [\W+]*C[\W+]*Program[\W_]*Files[\W+]*[... |
| APPLEMOBILEDEVICESERVICE | "AppleMobileDeviceService.exe" | | VIEW PROCESSES | cmdb_ci_applemobiledeviceservice | [\W+]*C[\W+]*Program[\W_]*Files[\W+]*[... |
| FIRESVC | "FireSvc.exe" | | VIEW PROCESSES | cmdb_ci_firesvc | [\W+]*C[\W+]*Program[\W_]*Files[\W+]*Mc... |

*FIG. 3*

DISCOVERY PROCESS IDENTIFICATION AND CLASSIFICATION

BACKGROUND

The present disclosure relates generally to techniques for performing discovery processes, and more specifically, to techniques for identifying and classifying processes and applications executing in a network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These remote resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment (e.g., servers and related software) or investing large amounts of time in establishing a private network infrastructure. Instead, by utilizing cloud computing resources, users are able redirect their resources to focus on their enterprise's core functions.

Certain cloud computing services can host a configuration management database (CMDB) that tracks information regarding configuration items (CIs) associated with a client. These CIs, for example, may include hardware, software, or combinations thereof, disposed on, or operating within, a client network. Additionally, the CMDB may define discovery processes jobs that are provided to a discovery server operating on the client network. The discovery server may execute the discovery processes to collect CI data that is provided to, and stored within, the CMDB.

Due to the growing amount of data that may be present in a data storage or management system, executing and responding to query requests continue to increase in time and complexity. Further, execution of a discovery process in response to a query request may consume a signification amount of time and computing resources when a large number of CIs are present and a large number of discovery patterns are to be executed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments presented herein provide apparatus and techniques for identifying and classifying processes and associated applications executing in a network. All processes executing in a network may be identified using a discovery process. The processes may be clustered based on associations between the processes. A user may provide input related to one or more clusters of processes. Suggested application entries may then be generated based at least in part on the clusters of processes. A configuration item type and a discovery pattern may be generated for each suggested application entry. A subsequent discovery process may use the configuration item type and discovery patterns to identify associated configuration items in the network.

After receiving a query request, a processor may determine whether the query request contains an analysis operation. If the query request contains a first type of operation (e.g., an analysis operation), the processor may determine which of the one or more databases has data entries related to the query request. If a first database of the one or more databases contains data entries related to the query request, then the processor may send the query request to the first database for querying. If the first database does not contain data entries related to the query request, a replicator component may copy the relevant data entries from a second database to the first database before the processor sends the query request to the first database. On the other hand, if the query request does not contain the first type of operation, then the processor may send the query request to the second database.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

FIG. 3 is an example of a suggested application table, in accordance with aspects of the present disclosure.

DETAILED DESCRIPTION

Figure 1:
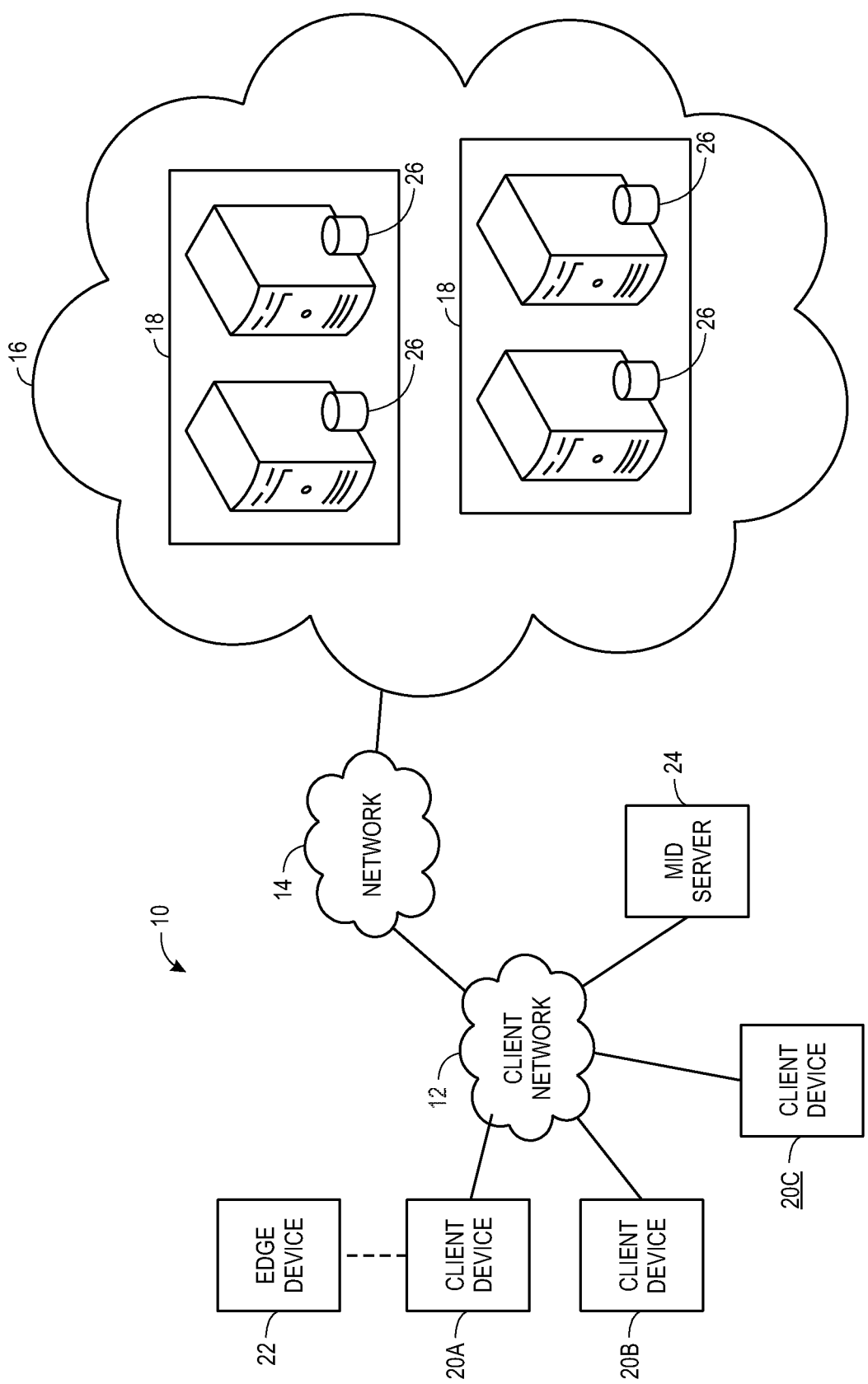
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, a "configuration item" (CI) may refer to a record for any component or aspect (e.g., a computer, a device, a piece of software, a database table, a script, a webpage, a license, a piece of metadata, and so forth) in an enterprise network, for which relevant data, such as manufacturer, vendor, location, or similar data, is stored in a cloud-based platform, such as a CMDB. A discovery pattern can be used to identify various CIs in a particular network and various attributes associated with the CIs. A CI type may include a database, an application server, an infrastructure service, an application, a web server, a load balancer, an endpoint (e.g., an entry point), and the like.

As discussed in greater detail below, the present embodiments described herein improve efficiencies in performing queries on a database. Due to the growing amount of data that may be present in a data storage or management system, executing and responding to query requests continue to increase in time and complexity. As a result, directing query requests to appropriate database engines may improve efficiency and/or reduce response times to query requests and may provide more useful analytical use cases. In one example, one or more databases may contain one or more sets of data entries. The one or more databases may include a row-oriented database and a column-oriented database.

After receiving a query request, a processor may determine whether the query request contains an analysis operation. If the query request contains a first type of operation (e.g., an analysis operation), the processor may determine which of the one or more databases has data entries related to the query request. If a first database of the one or more databases contains data entries related to the query request, then the processor may send the query request to the first database for querying. If the first database does not contain data entries related to the query request, a replicator component may copy the relevant data entries from a second database to the first database before the processor sends the query request to the first database. On the other hand, if the query request does not contain the first type of operation, then the processor may send the query request to the second database.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized.

Execution of a discovery process may consume a significant amount of time and computing resources when a large number of CIs are present and a large number of discovery patterns are to be executed. Further, identification and classification of processes associated with the CIs and executing in a network may increase the time, processing power, and/or computing resources to complete an entire discovery process. Embodiments presented herein may reduce the time and computing resources used to complete the discovery process by grouping the processes. The grouping (e.g., clustering) of associated processes into applications may reduce a number of items to be identified during the discovery process.

FIG. 1 is a schematic diagram of a cloud computing system 10 where embodiments of the present disclosure may operate. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks.

As shown in FIG. 1, the client network 12 is able to connect to one or more client devices 20A, 20B, and 20C so that the client devices are able to communicate with each other and/or with the network hosting the cloud-based platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16.

FIG. 1 also illustrates that the client network 12 includes an administration or managerial device, agent, or server, such as a measurement, instrumentation, and discovery server (MID) server, which may function as or be implemented as a discovery server 24 as discussed herein, that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system. In some embodiments, the discovery server 24 may be a JAVA applet or similar application executing in the cloud-based platform 16.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM)-based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center 18 could correspond to a different geographic location.

Each of the data centers 18 includes multiple virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

One or more of the virtual servers 26 may include a suggestion engine which performs one or more operations discussed herein. For example, the suggestion engine may identify one or more processes executing on the client network 12 and analyze the processes to generate one or more suggested application entries based on the processes. The suggestion engine may group related processes that make up the suggested application entries, as discussed in more detail below.

Although FIG. 1 illustrates specific embodiments of a cloud computing system 10, the disclosure is not limited to the specific embodiments illustrated in FIG. 1. For instance, although FIG. 1 illustrates that the platform 16 is implemented using data centers, other embodiments of the platform 16 are not limited to data centers and can utilize other types of remote network infrastructures. The use and discussion of FIG. 1 are only examples to facilitate ease of description and explanation and are not intended to limit the disclosure to the specific examples illustrated therein.

As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 2:
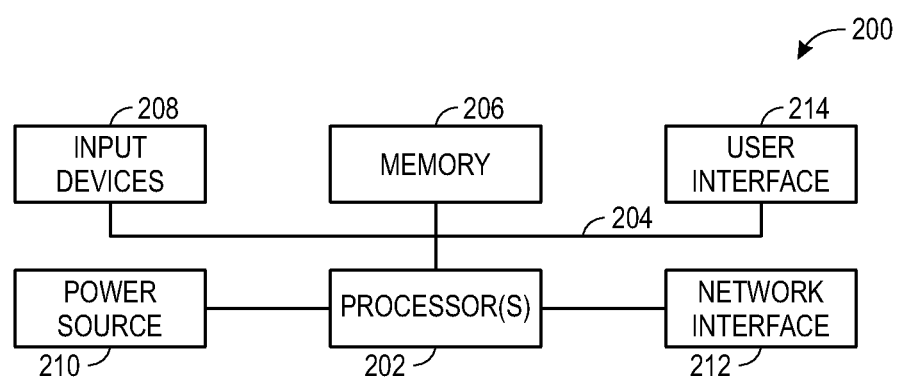
FIG. 2 is a block diagram of a computing device utilized in a computing system that may be present in FIG. 1, in accordance with aspects of the present disclosure.

By way of background, it may be appreciated that the present approach may be implemented using one or more processor-based systems such as shown in FIG. 2. Likewise, applications and/or databases utilized in the present approach may be stored, employed, and/or maintained on such processor-based systems. As may be appreciated, such systems as shown in FIG. 2 may be present in a distributed computing environment, a networked environment, or other multi-computer platform or architecture. Likewise, systems such as that shown in FIG. 2, may be used in supporting or communicating with one or more virtual environments or computational instances on which the present approach may be implemented.

With this in mind, an example computer system may include some or all of the computer components depicted in FIG. 2, which generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like.

The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

With this in mind, to improve computational efficiency and system performance in executing classification process and responding to query requests, the computing system 200, as discussed in FIG. 2, may identify one or more suggested application entries based at least in part on results of a discovery process and classify the one or more suggested application entries to be used in subsequent discovery processes. The suggested application entries may be identified based on results of a clustering analysis performed on the results of the discovery process. The clustering analysis may include grouping processes that are currently being executed by one or more client devices coupled to a network based on, for example, similarities in process name and process parameters.

The results of the clustering analysis may be used to train a machine learning model that can be used to improve performance and accuracy of subsequent application suggestions and execution of discovery processes. The machine learning model may include results from one or more client networks to further improve the accuracy thereof.

FIG. 3 is an example of a suggested application table 300, in accordance with aspects of the present disclosure. The suggested application table 300 includes one or more suggested application entries. Each suggested application entry includes a suggested application name 302, a main process 304, a process count 306, a link 308 to view the processes associated with the suggested application 302, a suggested CMDB class 310, and a suggested rule 312.

The main process 304 is a name of an executable file that, when executed by a processor, may execute the respective application name 302. The application name 302 may be generated based on a common term found in a number (e.g., a majority) of the processes for the suggested application entry. The main process 304 may be identified from the group of processes associated with the corresponding suggested application entry based on dependencies of the processes. For example, if a majority of the group of processes depend from a particular process in the group, the process from which they depend may be identified as the main process 304. The process count 306 indicates a number of processes that are associated with the suggested application entry and/or the suggested application name 302. The suggested CMBD class 310 may be an attribute that is shared by a majority of the processes associated with the suggested application name 302. For example, the CMDB class 310 may correspond to a CI type associated with a majority of the associated processes, with the application name 302, and/or the main process 304.

The suggested rule 312 is a regular expression (i.e., a regex) that is generated by the suggestion engine, discussed with respect to FIG. 1. The suggested rule 312 may be generated based on the processes associated with the suggested application entry and/or the suggested application name 302. For example, the suggested rule 312 may be generated based on the names and terms in the commands of the processes in the group/cluster. The suggested rule 312 may be executed to identify additional processes that are related to a particular suggested application entry. For example, the suggested rule 312 may be executed to determine whether any processes being executed in the client network should added to the corresponding suggested application entry. By doing so, a number of processes associated with a particular application may be increased. In turn, the time and computing resources used to identify and classify processes may also be reduced. The suggested rule 312 may be validated by executing the suggested rule 312 and determining whether additional (e.g., all) processes that are part of the corresponding group/cluster are identified.

The suggested application table 300 may be presented via the user interface 214 executing on a client device, such as the client devices 20A, 20B, 20C illustrated in FIG. 1. The user interface 214 enables interaction with the suggested application table 300. For example, in the user interface 214, a user may select one or more suggested application entries to confirm as a new application that will be recognized as an application during a subsequent discovery process. The user interface may also enable selection one or more suggested application entries to be "ignored" during the subsequent discovery process. In that case, each of the processes associated with the "ignored" application entry(ies) may be omitted by the subsequent discovery process. Omitting one or more processes or suggested application entries from a discovery process may improve performance of the discovery process and/or may reduce an amount of time and computing resources to perform the process.

Figure 4:
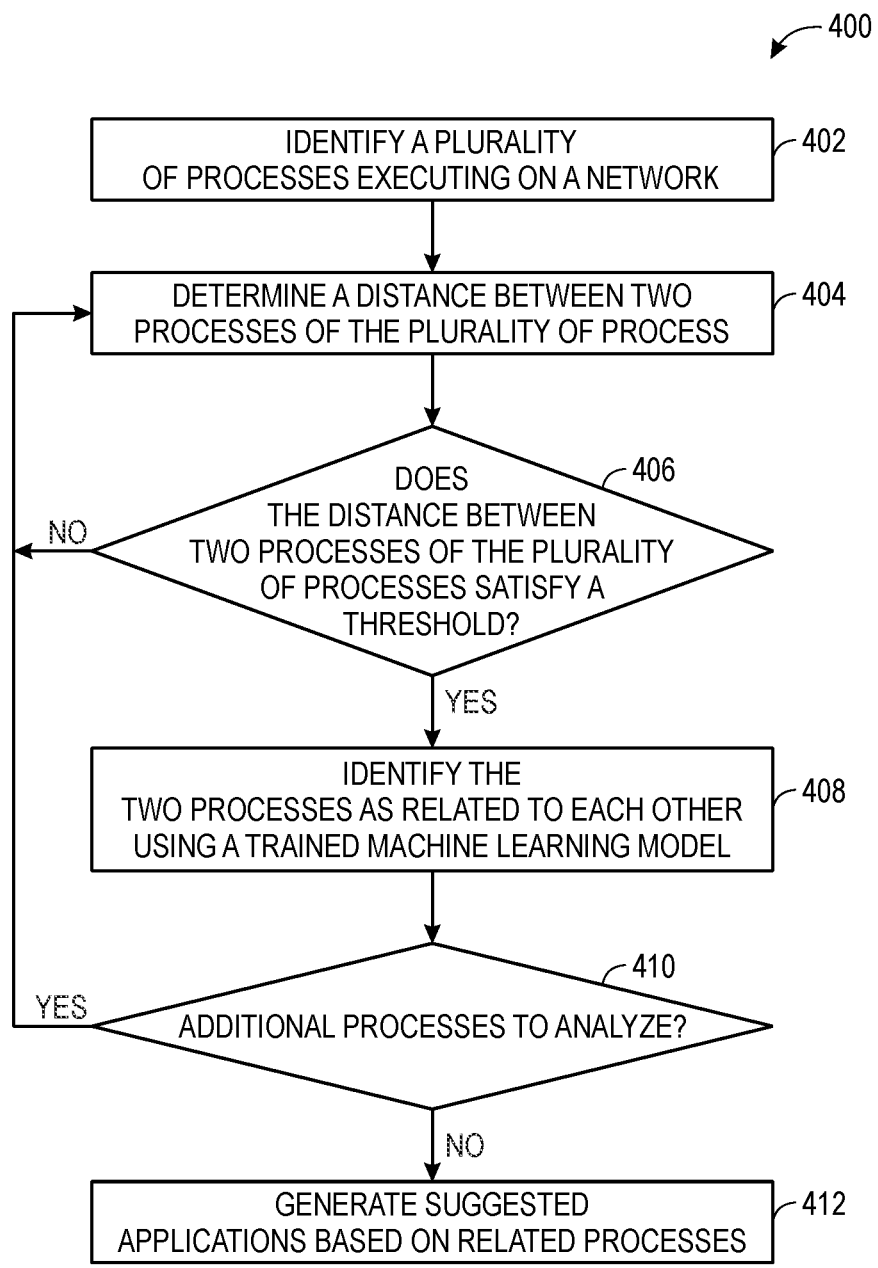
FIG. 4 is a flowchart illustrating operations corresponding to one example of analyzing processes executing on a network, in accordance with aspects of the present disclosure.

Each of the suggested application entries may be identified by the suggestion engine using a machine learning algorithm, such as a clustering algorithm. For example, FIG. 4 is a flowchart 400 illustrating operations corresponding to one example of analyzing processes executing on a network. The operations of the flowchart 400 may correspond to instructions stored in memory that are executed by a processor, such as the memory 206 and processor 202 discussed with respect to FIG. 2. The operations of the flowchart 400, when executed by the processor, may perform a cluster analysis of the processes executing on the network.

The flowchart 400 begins at operation 402 where the processer 202 initializes execution of a discovery process to identify a plurality of processes executing on a network. At operation 404, the suggestion engine, running on the virtual servers 26, determines a distance between two processes of the plurality of processes. For example, the suggestion engine may calculate a Euclidean or Levenshtein distance between the two processes.

As used herein, "distance" may refer to a difference between data. For example, a distance between two processes may be a minimum number of single-character edits (e.g., insertions, deletions, and substitutions) to change one process into the other process. Thus, the more similar two processes are to each other, the lower the distance between them. In some embodiments, the difference may be determined between a portion of a first process and a portion of a second process.

At operation 406, the suggestion engine determines if the Euclidean or Levenshtein distance satisfies a distance threshold. If the distance between the two processes does not satisfy the threshold, the flowchart 400 returns to operation 404 where the suggestion engine determines a distance between two additional processes of the plurality of processes. The two additional processes may include one of the processes previously analyzed by the suggestion engine. That is, if a distance between a first process and a second process does not satisfy the threshold at operation 406, the suggestion engine may determine a distance between the first process and a third process. Additionally or alternatively, the two additional processes may both be different than the previously analyzed processes.

If the distance determined at operation 404 satisfies the threshold at operation 406, the suggestion engine proceeds to operation 408 where the suggestion engine identifies the two processes as related to each other. That is, the two processes may be grouped together.

At operation 410, the suggestion engine determines whether there are additional processes to be analyzed. That is, the suggestion engine determines whether a distance has not been determined between any combination of two processes of the plurality of processes. If there is an additional combination of processes to be analyzed, the suggestion engine proceeds to operation 404 where the suggestion engine determines a distance between the additional combination of processes. If the suggestion engine determines that no further processes are to be analyzed, the suggestion engine may generate one or more suggested application entries in the suggested application table 300 based on the related processes, as discussed in more detail below.

Additionally or alternatively, operations 404-408 may be repeated until suggested application entries are obtained for more than a threshold (e.g., majority) of processes. That is, the operations may be repeated until a threshold number of processes are identified as related to each other. Once the processes are analyzed, the suggestion engine may identify the main process of the related processes, such as the main process 304, and generate an application name 302 for the suggested application entry as discussed with respect to FIG. 3. In other words, once the processes are analyzed, the suggestion engine may generate the suggested application table 300 to be presented via the user interface 214.

Figure 5:
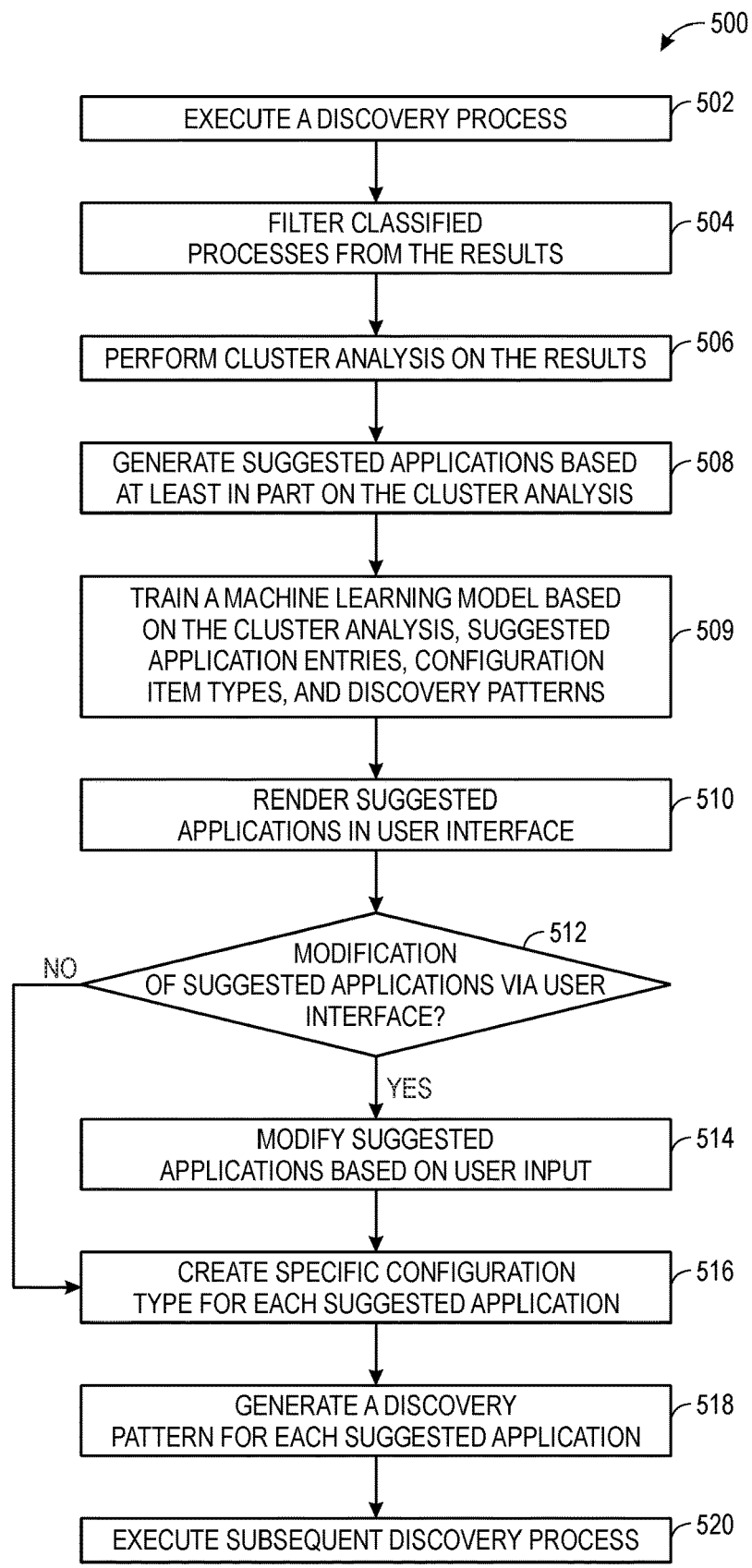
FIG. 5 is a flowchart illustrating operations corresponding to one example of identifying and classifying a suggested application entry, in accordance with aspects of the present disclosure.

FIG. 5 is a flowchart 500 illustrating operations corresponding to one example of a process of identifying and classifying a suggested application entry, in accordance with aspects of the present disclosure. The operations of the flowchart 500 may correspond to instructions stored in memory, such as the memory 206 discussed with respect to FIG. 2, that are executed by a processor, such as the processor 202 discussed with respect to FIG. 2. The flowchart 500 begins at operation 502 where a discovery process is executed. The discovery process may be a horizontal discovery or vertical discovery. The discovery process may be initiated by one or more processors, such as the processor 202 discussed with respect to FIG. 2.

At operation 504, the suggestion engine analyzes the results of the discovery process to filter any results that were previously classified. That is, processes identified by the discovery process that were previously classified as associated with a previously identified application may be removed from the results of the discovery process. Thus, the filtered results of the discovery process includes processes that are not associated with a current application executing on a client network.

At operation 506, the suggestion engine may perform cluster analysis on the results. As discussed with respect to FIG. 4, the cluster analysis may be performed to identify related processes within the results. Related processes may be identified using a Euclidean or Levenshtein distance between processes. If the distance satisfies the distance threshold, the two processes may be identified as related to and/or associated with each other. The processes that have a relation above the threshold may be identified as belonging to a group or cluster.

At operation 508, the suggestion engine generates one or more suggested application entries based at least in part on the results of the cluster analysis in operation 506. For example, a suggested application entry may be generated for each group or cluster of processes. To generate a suggested application entry, an application name 302, a suggested CMDB class 310, and a suggested rule 312 may be generated. A main process 304 may be identified from the group or cluster of processes. As discussed above, the application name 302 may be generated based on a term common to a majority of the associated processes. The CMDB class 310 may be generated based on a CI type associated with the processes in the group.

The results of the clustering analysis may be used to train (at operation 509) a machine learning model that can be used to improve performance and accuracy of subsequent application suggestions and execution of discovery processes. The machine learning model may include results from one or more client networks to further improve the accuracy thereof.

At operation 510, the suggestion engine may add the suggested application entries to a suggested application table, such as the suggested application table 300 discussed with respect to FIG. 3, which is rendered in a user interface of a client device. The suggested application table may include one or more suggested application entries based on the results of operations 506 and 508.

At operation 512, the suggestion engine determines whether one or more of the suggested application entries are modified via the user interface 214. That is, the suggestion engine may monitor and identify input received via the user interface 214. If one or more suggested application entries are modified, the suggestion engine modifies the corresponding suggestions application entry(ies) in the suggested application table based on the input at operation 514. For example, input received via the user interface 214 may modify processes associated with one of the suggested application entries. That is, the input may add and/or remove one or more processes from the suggested application entry. Adding a process to a suggested application entry may include associating a process with the suggested application entry or one or more processes of the suggested application entry. Removing a process from a suggested application entry may include removing an association between a particular processes of the suggested application entry and the other processes of the suggested application entry.

Adding processes that are associated with the suggested application entry and removing processes that are not associated with the suggested application entry, may improve the performance and accuracy of the suggested application table and subsequent discovery processes. For example, adding associated processes to a suggested application entry may reduce the number of individual processes to be analyzed in a subsequent discovery process. Similarly, removing unassociated processes from a suggested application entry may improve performance of executing a discovery process to identify CIs associated with the suggested application entry. In some embodiments, the added and/or removed processes may be included in the machine learning model to improve an accuracy of future suggested application entries.

Further, the user, via the user interface 214 on a client device, may identify one or more of the suggested application entries to be ignored during subsequent discovery processes. That is, input received via the user interface may indicate that the suggested application entry and all associated processes are to be ignored in the subsequent discovery processes. As discussed above, for each application entry indicated as ignored, a subsequent discovery process will omit each process associated with that application entry. The input may also identify one or more of the suggested application entries to confirm as an application. In that case, the confirmed application entries may be stored in an application database, such as the CMDB.

If the suggested application entries are not modified at operation 512, the flowchart 500 proceeds to operation 516 where the suggestion engine creates a specific CI type for one or more suggested application entries in the suggested application table 300. That is, a specific CI type may be created for each suggested application entry that was not indicated to be ignored. The CI type for a particular application entry may correspond to attributes of the application entry including a host of the application, such as a server instance. The CI type may also correspond to relationships of the created CI type with other new or existing CI types. For example, the created CI type may include hierarchy information (e.g., dependencies on other new or existing CI types) such that attributes of a parent CI type are automatically included in a child CI type. The generated CI types and the associated suggested application entries may be stored in the cloud-based platform, such as the CMDB.

At operation 518, a discovery pattern is generated for each suggested application entry. A discovery pattern may include a series of operations to identify a corresponding CI or CI type. The discovery pattern may detect one or more attributes of a CI or CI type such as a type of entry point of the CI (HTTP, TCP, etc.), an IP address, a port, an operating system, software executing on the CI, memory, and the like. In some embodiments, more than one discovery pattern may be generated to discover a single type of CI, and/or a particular discovery pattern may be used to discover multiple types of CIs. The discovery pattern may identify the CIs and gather data associated with the CIs, such as an operating system (OS) of the CI, an OS version of the CI, a server hosting the CI, a location, disk space, a CPU count, a CPU speed, an amount of RAM available to the CI, a manufacturer, an IP address, connections of the CI within the network, external connections of the CI, and the like. The data associated with the CIs may be stored in the CMDB.

At operation 520, a subsequent discovery process may be executed to discover CIs associated with the created CI types and associated discovery patterns. The subsequent discovery process may be a horizontal or vertical discovery process. The subsequent discovery process may identify CIs associated with the newly created CI types and associated discovery patterns. These CIs may be coupled to a particular network, such as client network 12 discussed with respect to FIG. 1.

Advantageously, the operations of the flowchart 500 may improve a computational efficiency of a discovery process and reduce an amount of hardware and/or software resources used to execute the discovery process. Further, the operations of the flowchart 500 may improve efficiencies in identifying and generating suggested application entries and improve efficiency and/or reduce an amount of time to execute subsequent discovery processes. Accordingly, embodiments described herein improve the functionality of performing discovery processes and the efficiency of the hardware and/or software executing such discovery processes.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
   identifying a plurality of processes executing in a network, each process of the plurality of processes comprising a component of a respective application executing in the network;
   filtering the plurality of processes to remove one or more processes associated with an existing configuration item from the plurality of processes;

identifying one or more subsets of the plurality of processes by analyzing similarities in the one or more subsets;
generating one or more suggested application entries in a suggested applications table corresponding to the one or more subsets of the plurality of processes, each suggested application entry comprising a respective main process of a respective subset of the one or more subsets, a respective configuration item type associated with a host of at least one process of the one or more subsets, and a respective rule based at least in part on a name associated with the at least one process;
generating a discovery pattern for a respective suggested application entry of the one or more suggested application entries based at least in part on the respective rule; and
executing a subsequent discovery process to identify additional processes executing in the network using the discovery pattern for the respective suggested application entry of the one or more suggested application entries, wherein the additional processes are associated with the respective subset of the one or more subsets of the plurality of processes.

2. The method of claim 1, comprising:
receiving an input associated with at least one of the one or more suggested application entries; and
modifying the one or more suggested application entries based at least in part on the input associated with at least one of the one or more suggested application entries.

3. The method of claim 1, wherein each of the one or more subsets of the plurality of processes comprises one or more associated processes of the plurality of processes.

4. The method of claim 1, comprising:
generating configuration item types for the one or more suggested application entries, wherein the discovery pattern for each of the one or more suggested application entries is based at least in part on a corresponding configuration item type, and wherein the configuration item types for the one or more suggested application entries are specific to corresponding suggested application entries.

5. A tangible, non-transitory, and machine-readable medium storing machine-readable instructions, that when executed by a processor, cause the processor to perform operations comprising:
identifying a plurality of processes executing in a network, each process of the plurality of processes comprising a component of a respective application executing in the network;
performing cluster analysis on the plurality of processes to identify one or more subsets of the plurality of processes, each of the one or more subsets of the plurality of processes comprising one or more related processes of the plurality of processes;
generating one or more suggested application entries in a suggested applications table corresponding to the one or more subsets of the plurality of processes, each suggested application entry comprising a respective main process of a respective subset of the one or more subsets, a respective configuration item type associated with a host of at least one process of the one or more related processes of the respective subset, and a respective rule based at least in part on one or more names associated with the one or more related processes; and
generating a discovery pattern for a respective suggested application entry of the one or more suggested application entries based at least in part on the respective rule, the discovery pattern configured to enable a discovery process to identify additional processes executing in the network, wherein the additional processes are associated with the respective subset of the one or more subsets of the plurality of processes.

6. The tangible, non-transitory, and machine-readable medium of claim 5, the operations comprising:
receiving, via a user interface, an input associated with at least one of the one or more suggested application entries; and
modifying the one or more suggested application entries based at least in part on the input associated with at least one of the one or more suggested application entries via the user interface.

7. The tangible, non-transitory, and machine-readable medium of claim 6, wherein modifying the one or more suggested application entries comprises removing one or more processes in a first subset of the one or more subsets.

8. The tangible, non-transitory, and machine-readable medium of claim 6, wherein modifying the one or more suggested application entries comprises adding one or more processes of the plurality of processes that are not included in the one or more subsets of the plurality of processes to the one or more subsets.

9. The tangible, non-transitory, and machine-readable medium of claim 5, the operations comprising:
filtering the plurality of processes to remove one or more processes from the plurality of processes that are associated with currently-executing applications; and
generating configuration item types for the one or more suggested application entries, wherein the discovery pattern for the respective suggested application entry of the one or more suggested application entries is based at least in part on a corresponding configuration item type.

10. The tangible, non-transitory, and machine-readable medium of claim 9, wherein the configuration item types for the one or more suggested application entries are specific to corresponding suggested application entries.

11. The tangible, non-transitory, and machine-readable medium of claim 9, wherein identifying the one or more subsets of the plurality of processes comprises using a machine learning model that is trained using the one or more suggested application entries, the configuration item types for the one or more suggested application entries, and discovery patterns for the one or more suggested application entries.

12. The tangible, non-transitory, and machine-readable medium of claim 11, the operations comprising:
training the machine learning model using previously suggested application entries for one or more other networks not associated with a client device.

13. The tangible, non-transitory, and machine-readable medium of claim 5, wherein the one or more suggested application entries, a corresponding subset of the plurality of processes, a corresponding configuration item type, and a corresponding discovery pattern are stored in a configuration management database.

14. A system comprising:
a processor; and
a memory storing instructions, that when executed by the processor, cause the processor to perform operations comprising:
  identifying a plurality of processes executing in a network, each process of the plurality of processes comprising a component of a respective application executing in the network;
  determining respective distances between different respective pairs of the plurality of processes;
  identifying one or more subsets of the plurality of processes based at least in part on the respective distances, each of the one or more subsets of the plurality of processes comprising one or more related processes of the plurality of processes;
  generating one or more suggested application entries corresponding to the one or more subsets of the plurality of processes, each suggested application entry comprising a respective main process of a respective subset of the one or more subsets, a respective configuration item type associated with a host of at least one process of the one or more related processes of the respective subset, and a respective rule based at least in part on one or more names associated with the one or more related processes;
  generating a discovery pattern for a respective suggested application entry of the one or more suggested application entries based at least in part on the respective rule; and
  executing a subsequent discovery process to identify additional processes executing in the network using the discovery pattern for the respective suggested application entry of the one or more suggested application entries, wherein the additional processes are associated with the respective subset of the one or more subsets of the plurality of processes.

15. The system of claim 14, the operations comprising:
receiving an input associated with at least one of the one or more suggested application entries via a user interface; and
modifying the one or more suggested application entries based at least in part on the input associated with at least one of the one or more suggested application entries via the user interface.

16. The system of claim 15, wherein modifying the one or more suggested application entries includes removing an association between one or more processes in a first subset of the one or more subsets and the other processes in the first subset.

17. The system of claim 14, wherein the respective distances comprise Euclidean distances or Levenshtein distances.

18. The system of claim 14, the operations comprising:
filtering the plurality of processes to remove one or more processes that are associated with currently-executing applications; and
generating configuration item types for the one or more suggested application entries, wherein the discovery pattern for the respective suggested application entry of the one or more suggested application entries is based at least in part on a corresponding configuration item type.

19. The system of claim 18, wherein the configuration item types for the one or more suggested application entries are specific to corresponding suggested application entries.

20. The system of claim 14, wherein identifying the one or more subsets of the plurality of processes comprises using a machine learning model.

* * * * *